United States Patent Office 3,413,406
Patented Nov. 26, 1968

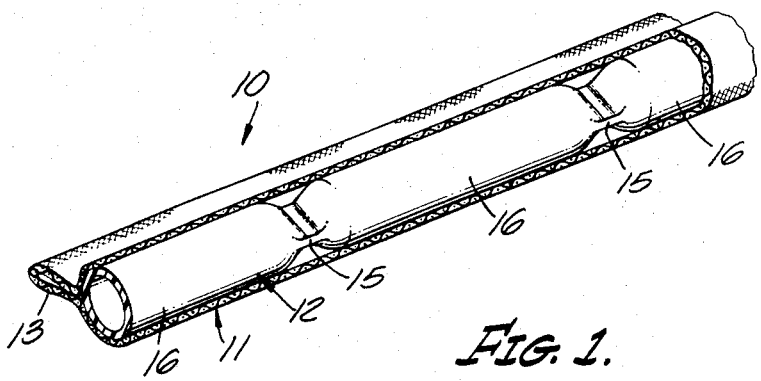
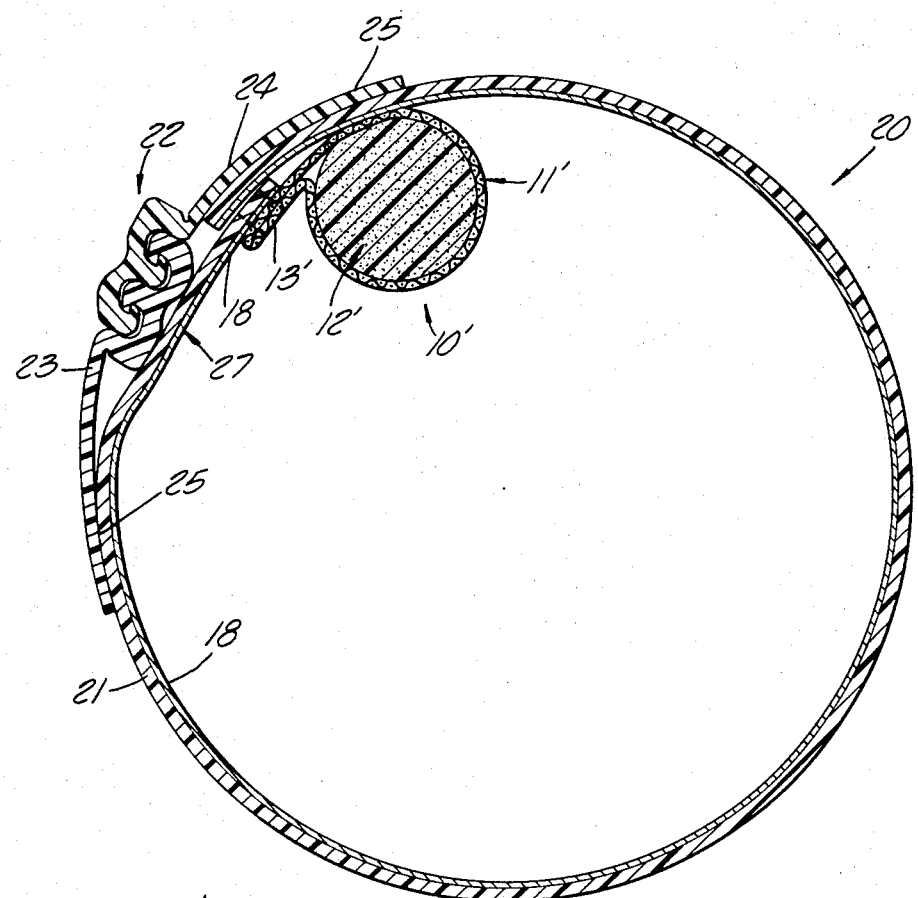

3,413,406
SHIELDED GASKETING AND SEAMED
JACKETING UTILIZING THE SAME
Walter A. Plummer, 3546 Crownridge Drive,
Sherman Oaks, Calif. 91403
Filed Apr. 10, 1967, Ser. No. 629,551
6 Claims. (Cl. 174—3)

ABSTRACT OF THE DISCLOSURE

A resilient gasket for use in shielding against passage of electrical fields featuring a spongy core of air-charged cells enclosed by closely-spaced flexible wires and preferably including a mounting strip for the gasket formed by the wire covering and projecting laterally from one side of the gasket. The gasket is highly flexible and resilient and particularly suitable for use with the closure assembly of seamed shielded jacketing for conductors, cabling and the like.

---

This invention relates to resilient shielded gasket and to a shielded jacket utilizing this gasket material and effective to enclose components to be safeguarded against the passage of electrical fields.

It is becoming increasingly important to provide high efficiency electrical shields to prevent the passage of electrical fields to or from electrical components or the like adversely affected by such fields. The present invention features resilient gasket material suitable for use across or between gaps of electrical shielding material. One typical example is the gap between the guard flap and main body of flexible tubular shielding material of the type commonly applied about electrical cables and other components of like nature. Another application is between components of access doors of electrically shielded rooms. In an illustrative embodiment of the invention a resilient gasket of soft flexible material is secured along the edge of a guard flap of a laminated tubular jacket provided with an access seam. The guard flap of laminated shielding material underlies and bridges the seam forming means and it is important to provide electrical continuity between the edge of this guard flap and the juxtaposed main body of the shielding material. The invention gasketing is arranged to be compressed between the cabling and the layer of conductive shielding material on the other side of the gasket thereby utilizing the gasket to maintain continuous positive electrical contact and additionally to maintain the jacket expanded and slightly tensioned circumferentially thereof. In one embodiment the gasket is filled with spongy resilient material and in a second embodiment the gasket includes a resilient tubular core sealed transversely thereof at intervals to provide captive cells of gas at any appropriate pressure effective to restore the core to its normal cylindrical configuration as the load on the gasket is removed and to accommodate changes in loading on the gasket.

The present invention embodies improvements over the shielded jacketing disclosed in my U.S. Patent 2,960,-561 granted Nov. 15, 1960, entitled, Shielded Wire Harness. In the jacketing there shown, electrical continuity is provided by overturning the lateral edge of the guard flap to bring its conductive layer into position to contact the main body of the shield. It sometimes happens that the cabling jacketed by this shield does not apply sufficient pressure to all portions of the guard flap to assure continuous contact with the result that a slight gap can occur through which stray electrical fields pass. In addition, it is necessary according to this prior construction to overturn the edge of the guard flap or to embrace the edge of the guard flap with a conductive strip of metal foil or the like. It is further necessary to extend a length of conductive material from the guard flap to facilitate grounding of the conductive layer.

The present invention provides a combined conductive and resilient gasket and grounding terminal which is securable to the edge of the guard flap without need for overturning its edge and which is sufficiently resilient to be compressed between the cabling and the main body of the shield as an incident to closing of the jacket seam. In its assembled condition the shielding jacket provided by the invention utilizes the resilience of the gasketing material to provide positive and continuous electrical contact between the guard flap and the main shielding at all times.

In an alternative embodiment of the gasket material, the resilient core is provided by a hollow tube of resilient material segregated into closely spaced captive cells of gas under any suitable pressure. This captive gas is highly effective in accommodating changes in loading, in restoring the gasket to its normal expanded condition and in providing resilient and continuous pressure tending to maintain the gasket expanded against a load applying surface at all times despite the application of shock or vibration forces and is highly effective in preventing the core material from taking a set under prolonged load conditions.

Accordingly, it is a primary object of the present invention to provide an improved inexpensive tubular shield adapted to be readily assembled about cabling or other objects as a barrier against the passage of RF electrical fields and featuring an improved positively acting shielded gasket.

Another object of the invention is the provision of an improved flexible expandable RF shielding gasket for use in providing electrical continuity between relatively movable shield components.

Another object of the invention is the provision of an improved electrical gasket featuring an expandable core having closely spaced cells of captive gas.

Another object of the invention is the provision of an improved electrical gasket urged continuously toward its expanded condition by a multiplicity of cells of pressurized gas.

These and other more specific objects will appear upon reading the following specification and claims and upon considering in connection therewith the attched drawings to which they relate.

Referring now to the drawings in which preferred embodiments of the invention are illustrated.

FIGURE 1 is a perspective view of one preferred embodiment of electrical gasketing material with parts broken away to show details of the construction; and FIGURE 2 is a cross-sectional view through a tubular RF shielding jacket embodying a second preferred embodiment of the resilient gasket.

Referring initially to FIGURE 1, there is shown one preferred embodiment of an RF shielding gasket utilizing principles of this invention and designated generally 10. This gasket has a generally tubular main body 11 enclosing a tubular hollow core 12. Main body 11 comprises a multiplicity of fine electrical conductors intermeshed with one another either in a closely knit or braided arrangement, or the like, the girth preferably being sufficiently large to embrace resilient core 12 and to provide a flattened mounting web 13 projecting laterally from the jacket and useful in supporting the gasket and in electrically connecting it to other shielding material by stitching, metal bonding or the like.

Resilient core 12 comprises a hollow tubular member of flexible and supple thermoplastic or the like material extending continuously from end-to-end of metallic cover 11. To assure the effectiveness of the core tube in constantly urging the wire braid or netting to its extended condition against a load and to accommodate the gasket to the shape of the load, tube 12 is preferably heat sealed together transversely thereof at intervals indicated at 15, 15, thereby to provide closely spaced sealed cells 16 charged with gas. In certain applications, particularly those under sub-atmospheric conditions, it may be desirable that the internal pressure of the individual cells be less than atmospheric. In other applications it will be desirable that the gas pressure within the cells be super-atmospheric to provide a satisfactory seal. In either case the pressure condition within the cells is easily controlled at the time of forming the heat seals 15.

For example, a desired pressure condition within the hollow tube is arranged while the opposite ends of long lengths of the tube are held closed. While this condition is maintained heated sealing shoes are depressed against the opposite sides of the tubing until the individual narrow seals 15 are formed and the fused seam has taken a set. Gas at the desired pressure is then trapped within the individual cells. The same technique is employed irrespective of whether the desired internal pressure is sub-atmospheric or super-atmospheric.

Referring now to FIGURE 2, there is shown a unique mode of utilizing a second preferred embodiment of the gasket. The modified gasket there shown is designated generally 10' and includes an outer tubular layer of metallic wires or filaments 11' enclosing a cylindrical core 12' of resilient spongy material as sponge rubber or sponge thermoplastic having a multiplicity of closed cells charged with captive gas. The presence of the closed cells greatly increases the resiliency of the material and greatly augments its capability for resuming its normal shape after either short or prolonged compression. As is true of the FIGURE 1 embodiment, gasket 10' includes a mounting flange or strip 13' integral with the metallic layer and projecting from one side thereof. In certain applications spongy or resilient core material provides adequate resiliency.

According to one mode of use, the gasket shown in either FIGURE 1 or 2, has its mounting flange stitched, bonded or otherwise securely and electrically mounted against conductive layer 18 forming part of the laminated tubular shielding jacket designated generally 20. Layer 18 may comprise metal foil bonded or otherwise laminated to a layer of impervious, dielectric material 21 such as any one of a number of well known supple, flexible, thermoplastic materials readily available commercially, such as polyvinyl chloride, polyethylene, and the like.

Shielding jacket 20 is provided along its opposite lateral edges with suitable seam forming means 22 here shown as comprising a pair of identical tapes 23, 24 extruded from thermoplastic material and having oppositely facing tongues and grooves in their overlapping portions shaped to interlock with one another when pressed into mating relationship. This type of interlocking seam is well known to those skilled in this art and its oppositely directed mounting flanges are readily heat fusible or otherwise bondable to outer layer 21 as is indicated at 25. Tape 23 is preferably applied inwardly of one lateral edge of the jacket main body in order to provide a guard flap 27 which, taken with gasket 10', is effective to bridge the underside of seam 22 with the result that conductive outer layer 11' of the gasket will make good electrical contact with the other edge of conductive layer 18.

As shown in FIGURE 2, no cabling is present within jacket 20 with the result that there is no load on gasketing 10' and it is therefore fully expanded. However, it will be appreciated that in actual use the jacket is assembled about a cable or the like and that gasket 10', or its counterpart 10 shown in FIGURE 1, will be very substantially compressed longitudinally thereof with its conductive layer pressed positively and firmly against the inner metallic lamination 18 of the jacket. Should the shielded assembly be flexed or subject to impact blows or to vibrations, the resilience of the gasket together with the compressed stresses stored therein will be highly effective in maintaining continuous electrical contact throughout the full length of the gasket and the juxtaposed portion of shielding layer 18.

While the particular shielded gasketing and seamed jacketing utilizing the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Seamed shielded jacketing for use in enclosing cabling and the like to provide a barrier against the passage of electrical fields through the jacketing, said jacketing comprising a longitudinally split tubular main body including a layer of flexible electrically conductive material, a pair of seam-forming members secured about the lateral edge portions of said main body sufficiently inwardly of at least one edge thereof to form a guard flap underlying said seam forming members, and resilient conductive gasket means secured lengthwise of said guard flap and adapted to be compressed between the juxtaposed portion of said layer of conductive material and the cabling embraced thereby to assure a continuous tubular shield of conductive material from end-to-end of said jacketing in the assembled condition thereof, said gasket means comprising a core of thick non-conductive spongy material having a multiplicity of closed air cells distributed therealong enclosed by a conductive flanged jacket of closely-spaced fine wires effective to provide a high efficiency shield against the passage of electrical fields.

2. Shielded jacketing as defined in claim 1 characterized in that said resilient spongy core fills said flanged jacket and acts to hold the same normally expanded irrespective of the presence or absence of external loading thereon.

3. Shielded jacketing as defined in claim 1 characterized in that said spongy core comprises a hollow tube sealed closed crosswise thereof at spaced intervals to provide sealed cells of captive gas which is compressed whenever one of said cells is deformed.

4. An electrically-conductive elongated gasket member for use in the fabrication of electrical shielding jackets comprising a flexible tubular layer formed of a multiplicity of intermeshed electrical conductors cooperating to provide an elongated tubular electrical shield, and a resilient tubular core enclosed within said tubular shield and acting to maintain the latter resiliently expanded, and a mounting flange for said gasket member formed of said intermeshed conductors and projecting laterally from one side thereof, said tubular core being closed transversely thereof at intervals therealong to provide cells of trapped gas effective to restore the normal shape of said tubular core upon release of a load therefrom.

5. A resilient gasket as defined in claim 4 characterized in that said flexible conductive layer includes as an integral part thereof a mounting flange of conductive material extending along one side thereof for use in mounting said gasket in its operating environment.

6. A resilient gasket as defined in claim 4 characterized in that said trapped gas is normally under a predetermined pressure other than atmospheric.

References Cited

UNITED STATES PATENTS

| 2,981,788 | 4/1961 | Bunish | 174—115 |
| 3,026,367 | 3/1962 | Hartwell | 174—35 |
| 3,089,915 | 5/1963 | Plummer | 174—36 |

OTHER REFERENCES

"Suppressing Radio Interference With METEX Shielding Products," published by Metal Textile Corporation, Electronics Division, Roselle, N.J. (page 15 relied on).

DARRELL L. CLAY, *Primary Examiner.*